(12) United States Patent
Watanabe et al.

(10) Patent No.: US 9,281,693 B2
(45) Date of Patent: Mar. 8, 2016

(54) SYSTEM CONTROL APPARATUS FOR EQUIPMENT

(75) Inventors: Tohru Watanabe, Zushi (JP); Yasuko Shiga, Kawasaki (JP); Katsumi Kawano, Kawasaki (JP); Shigetoshi Sameshima, Machida (JP); Yoshiki Kakumoto, Sagamihara (JP); Michiki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 13/989,178

(22) PCT Filed: Mar. 30, 2011

(86) PCT No.: PCT/JP2011/001884
§ 371 (c)(1),
(2), (4) Date: Jul. 23, 2013

(87) PCT Pub. No.: WO2012/131767
PCT Pub. Date: Oct. 4, 2012

(65) Prior Publication Data
US 2014/0039714 A1    Feb. 6, 2014

(51) Int. Cl.
*G06F 19/00* (2011.01)
*H02J 4/00* (2006.01)
(Continued)

(52) U.S. Cl.
CPC ... *H02J 4/00* (2013.01); *H02J 3/14* (2013.01); *H02J 3/32* (2013.01); *H02J 3/46* (2013.01);
(Continued)

(58) Field of Classification Search
CPC .......... H02J 4/00; H02J 13/0006; H02J 3/14; H02J 3/32; H02J 3/46; H02J 2003/007; H02J 3/383; Y02E 40/72; Y02E 60/76; Y02E 10/563; Y02E 10/566; Y02E 70/30; Y02B 70/3225; Y04S 20/222; Y04S 10/123; Y04S 40/22

USPC ......................................................... 700/295
See application file for complete search history.

(56) References Cited

U.S. PATENT DOCUMENTS

2006/0244462 A1 * 11/2006 McCosh .................. H04L 12/10
324/522
2008/0030185 A1 * 2/2008 Metsker .................. G06F 1/266
323/304
(Continued)

FOREIGN PATENT DOCUMENTS

JP      05-284569 A    10/1993
JP      2002-044870 A  2/2002
(Continued)

OTHER PUBLICATIONS

European Search Report received in European Application No. 11862103 dated Sep. 10, 2014.

*Primary Examiner* — Michael D Masinick
(74) *Attorney, Agent, or Firm* — Mattingly & Malur, PC

(57) ABSTRACT

The system control apparatus for equipment for causing equipment to collaboratively operate includes: equipment profile management means for managing an equipment profile that is metadata representing the electrical properties of the equipment; control scenario management means for managing a control scenario in which is described metadata that states an operation to be fulfilled by the equipment; equipment detection means for detecting control-targeted equipment; electrical status monitoring means for monitoring an electrical status related to transfer of electrical power caused by equipment interconnections; equipment selection means for selecting equipment for use on the basis of the metadata described in the control scenario and the equipment profile; and control execution means for controlling the selected equipment.

10 Claims, 9 Drawing Sheets

(51) Int. Cl.
*H02J 3/46* (2006.01)
*H02J 3/32* (2006.01)
*H02J 3/14* (2006.01)
*H02J 13/00* (2006.01)
H02J 3/38 (2006.01)
H02J 3/00 (2006.01)

(52) U.S. Cl.
CPC ............ *H02J 13/0006* (2013.01); *H02J 3/383* (2013.01); *H02J 2003/007* (2013.01); *Y02B 70/3225* (2013.01); *Y02E 10/563* (2013.01); *Y02E 10/566* (2013.01); *Y02E 40/72* (2013.01); *Y02E 60/76* (2013.01); *Y02E 70/30* (2013.01); *Y04S 10/123* (2013.01); *Y04S 20/222* (2013.01); *Y04S 40/22* (2013.01)

(56) References Cited

U.S. PATENT DOCUMENTS

| | | | |
|---|---|---|---|
| 2008/0039980 A1* | 2/2008 | Pollack | B60L 11/1824 700/295 |
| 2009/0062970 A1* | 3/2009 | Forbes, Jr. | G01D 4/004 700/295 |
| 2011/0071694 A1* | 3/2011 | Mammone | G06Q 30/02 700/291 |
| 2011/0172841 A1* | 7/2011 | Forbes, Jr. | G01D 4/004 700/292 |
| 2011/0185196 A1* | 7/2011 | Asano | B60L 11/1809 713/300 |
| 2012/0049626 A1 | 3/2012 | Xu et al. | |
| 2012/0265586 A1* | 10/2012 | Mammone | G06Q 50/06 705/14.1 |
| 2014/0018969 A1* | 1/2014 | Forbes, Jr. | H02J 13/00 700/295 |
| 2014/0062195 A1* | 3/2014 | Bruschi | B60L 11/1842 307/38 |

FOREIGN PATENT DOCUMENTS

| | | |
|---|---|---|
| JP | 2002-271982 A | 9/2002 |
| JP | 2003-274561 A | 9/2003 |
| JP | 2005-151746 A | 6/2005 |
| WO | 2012030772 A2 | 3/2012 |

* cited by examiner

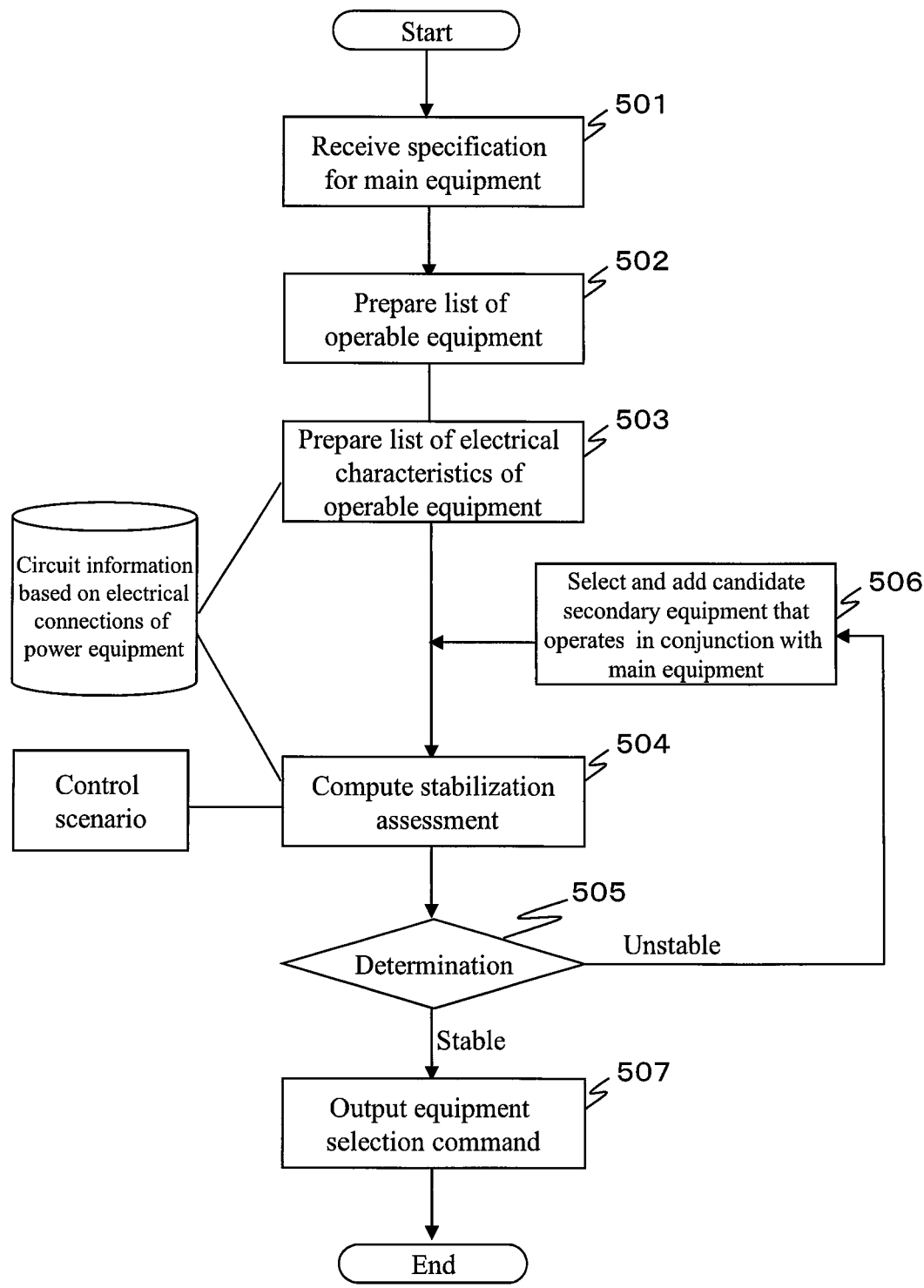

Fig. 6

| Equipment profile |
|---|
| +deviceType = "Battery"<br>+manufacturerType = "Name of manufacturing firm"<br>+model = "ES400V200M"<br>+version= "1.0"<br>+properties= {<br>    <cim:StorageBattery rdf:ID="Battery 46"><br>        <cim:Naming.name>Embodiment 1 name dictionary</cim:Naming.name><br>        <cim:Equipment.MemberOf_EquipmentContainer rdf:resource="Transformer 41"><br>        <cim:VoltageLevel.BaseVoltage>400</cim:VoltageLevel.BaseVoltage><br>    </cim:StorageBatter><br>    <cim:Location rdf:ID="Configuration drawing 1"><br>        <cim:Location.PowerSystemResource rdf:resource="Transformer 41 secondary-side power line"><br>    </cim:Location><br>    <cim:GmlPosition rdf:ID="CP1005"><br>        <cim:GmlPosition. X coordinate>187635</cim:GmlPosition. X coordinate><br>        <cim:GmlPosition. Y coordinate>772863</cim:GmlPosition. Y coordinate><br>    </cim:GmlPosition><br>    <cim:PowerLevel. Output>200kW</cim:PowerLevel. Output><br>    <cim:PowerLevel. Charge input>200kW</cim:PowerLevel. Charge input><br>    <cim:PowerLevel. Charging capacity>1000kWh</cim:PowerLevel. Charging capacity><br>    <cim:Response transfer function order>1</cim:Response transfer function order><br>    <cim:Response time constant>0.5</cim:Response time constant><br>    <cim:Response dead time constant>0</cim:Response dead time constant> |

Voltage control scenario

Begin control FLOW1 in {Main equipment A, secondary equipment list B, reference voltage V}
  Generation output allowed.main equipment A:
  while (Non-agreement determination.reference voltage V){
      Fluctuation absorption command.secondary equipment listB→b ;
      read Voltage;
  }
END_Publish FLOW1

SYSTEM CONTROL APPARATUS FOR EQUIPMENT

TECHNICAL FIELD

The present invention relates to a system control apparatus for equipment, and more particularly, to a system control apparatus for equipment that causes a plurality of pieces of equipment to collaboratively operate with one another in accordance with the properties of the equipment to realize an intended control.

BACKGROUND ART

Equipment of all sorts, such as energy equipment and production equipment, has increased, and these various types of equipment are equipped with advanced computer processing capabilities, making it important that this equipment be used collaboratively.

For example, in electric power distribution systems (the power grids of the electric power companies, the in-plant power distribution systems of manufacturing plants, and the independently operated power distribution systems that provide power to office buildings), end-user voltage rises at night when the load is low, and voltage falls during the daytime when the load is high. As a result of this, trouble may occur when using electrical equipment. In the technology described in PTL 1, the voltage in a power distribution line system is controlled by allowing collaboration among fuel cells, storage batteries, and other such equipment installed at facilities in order to connect new energy resources, such as solar power and wind power, storage batteries, and new power-demanding equipment, such as electric vehicles and large-scale heat pump-based hot water heaters, to electric power grids while stabilizing the power distribution line systems.

In the technology described in PTL 2, an operation indication terminal for controlling specific plant equipment using a plurality of control apparatuses is provided, an identification code of an operation command is sent from the operation indication terminal to an operation control apparatus, each control apparatus receives the identification code and executes a control operation, and the drive apparatus of the plant equipment is driven in accordance with the result of this operation.

CITATION LIST

Patent Literature

[PTL 1]
Japanese Patent Application Publication No. 2002-44870
[PTL 2]
Japanese Patent Application Publication No. H5-284569

SUMMARY OF INVENTION

Technical Problem

However, in the technology described in PTL 1, a center instructs the facility as to the power being generated by, and the power being transmitted/received to/from a fuel cell and/or a storage battery, and as such, data on the electric power generation of the fuel cell, the amount of energy stored in the storage battery, and the electric power consumption of the load must be sent/received to/from the center. In addition, the center's computer must store input/output data on fuel cells, storage batteries, and other such equipment, create and store detailed data on the equipment installation status of all the facilities, and must prepare control programs tailored to each piece of equipment. However, in an actual system, where equipment is constantly being augmented and replaced, changes must be made to the system configuration each time a piece of equipment is added or replaced, making it difficult to build and maintain a system within the limited number of person hours that can be spent for system operation.

In PTL 2, an identification code that a control apparatus is capable of receiving and operating on must be defined beforehand, and a control operation program for performing processing on the basis of the identification code must be prepared in each control apparatus and installed in the control apparatus beforehand as an arithmetic function. In addition, in a case where the plants targeted for control by the respective control apparatuses do not have the same equipment configuration, different programs and functions must be prepared for each control apparatus beforehand. Therefore, when controlling a variety of electrical power equipment, such as generators having various properties (solar power generators, diesel power generators, gas turbine generators, co-generation systems and various other types, in which the capacity, responsiveness, boot-up time, shutdown time, and continuous operating time differ for the same type of equipment), storage batteries (lead batteries, lithium-ion batteries, NaS batteries, and various other types, in which the capacity, responsiveness, boot-up time, shutdown time, and continuous operating time differ for the same type of storage battery), and voltage regulators (SVR, SVC, power capacitors, coils, and so forth), the problem is that the number of identification codes that has to be defined beforehand and the number of program functions that has to be defined beforehand become enormous, making it difficult to develop and maintain the system. In addition, in order to control the equipment, it is necessary to continuously send identification codes one by one to the control apparatus from the operation indication terminal, giving rise to problems from the standpoint of system operation in that the processing done by the operation indication terminal becomes enormous, and when the operation indication terminal shuts down due to a failure or the like, the control apparatus ceases to function, making it difficult to control the system as a whole.

Solution to Problem

To solve the above-mentioned problems, a system control apparatus for power equipment related to the present invention includes equipment profile management means for managing an equipment profile that is metadata representing the electrical properties of the equipment (including dynamic properties, and properties such as the type of electrical circuit that is capable of being formed with another piece of equipment), control scenario management means for managing a control scenario in which is described metadata that states an operation to be fulfilled by the equipment, equipment detection means for detecting a group of usable equipment, electrical status monitoring means for monitoring an electrical status related to transfer of electrical power caused by equipment interconnections, equipment selection means for selecting equipment for use on the basis of the metadata described in the control scenario and the equipment profile, and control execution means for controlling the selected equipment.

Advantageous Effects of Invention

The present invention makes it possible to build a system that electrically collaboratively operates power equipment when power equipment is augmented by the introduction of new energy resources and new power-demanding equipment.

BRIEF DESCRIPTION OF DRAWINGS

FIG. 1 is a drawing of the hardware configuration of power equipment system.
FIG. 2 is a drawing of the hardware configuration of a system control apparatus.
FIG. 3 is a block diagram of processing in the system control apparatus.
FIG. 4 is a flowchart showing system control processing.
[FIG. 5]
FIG. 5 is a flowchart showing an equipment selection process in detail.
[FIG. 6]
FIG. 6 is a drawing showing an equipment profile.
[FIG. 7]
FIG. 7 is a drawing showing a control scenario.
FIG. 8 is a drawing showing a voltage distribution in a case where the system control of this embodiment has been performed.
FIG. 9 is a drawing of the hardware configuration of a power equipment-embedded control apparatus.

DESCRIPTION OF EMBODIMENTS

Figure 1:
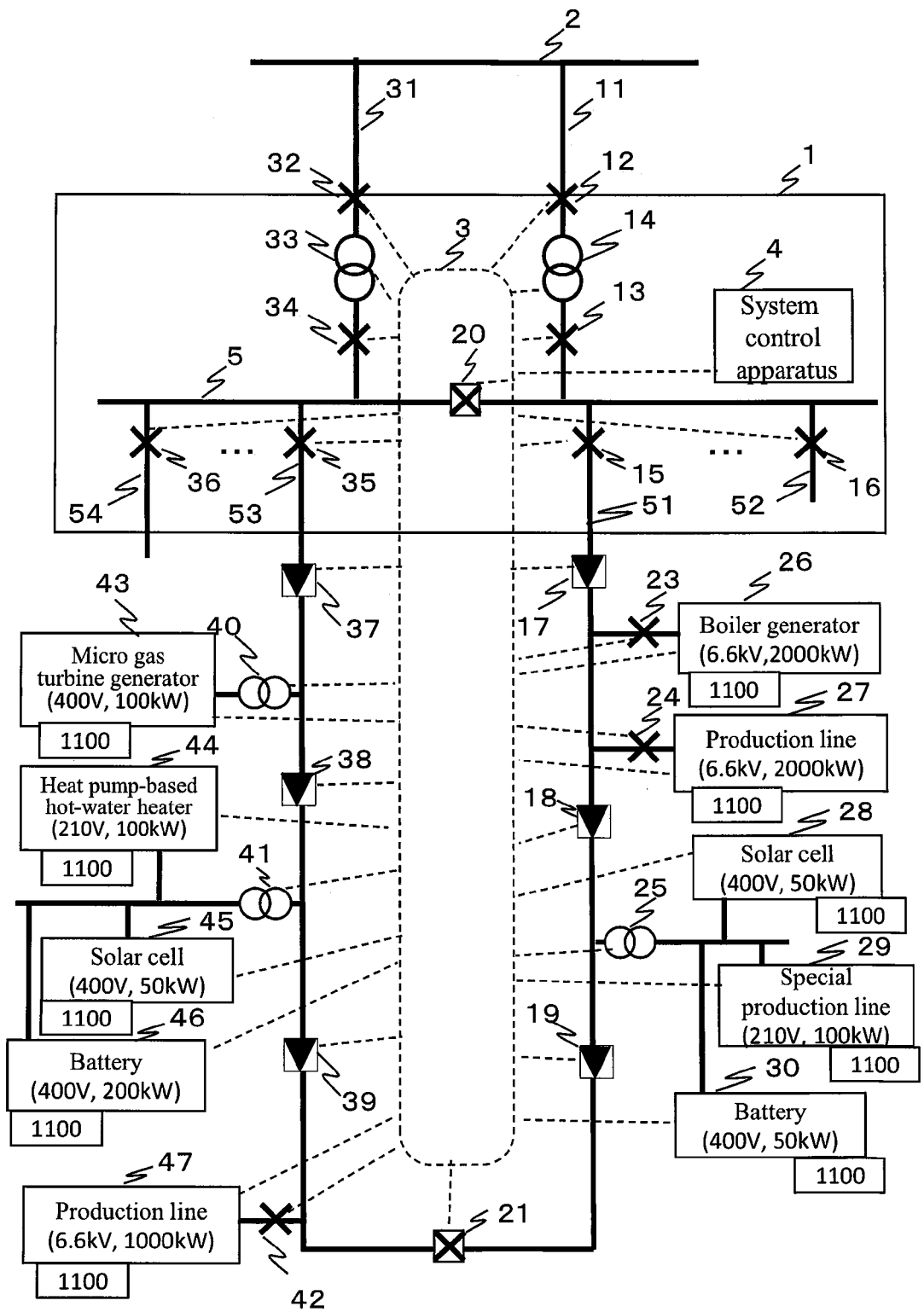
[FIG. 1]

This embodiment will be explained below by referring to the drawings.

FIG. 1 is a drawing showing the hardware configuration of a power equipment system related to this embodiment. This is a configuration in which an in-plant power distribution system, manufacturing equipment, and power generation equipment at a manufacturing plant are configured into a system using electrical connections and information communication connections. Power receiving equipment 1 draws in electrical power at a special high voltage (a 22-kV reference voltage) from an ordinary power grid 2 using power receiving lines 11, 31, transforms this electrical power to a high voltage (a 6.6-kV reference voltage) using transformers 14, 33, and distributes the power from a generating line 5 throughout the plant using feeder lines 51, 52, 53, 54. Section switches 17, 18, 19, 37, 38, 39 are installed on the feeder lines, making it possible to change the electrical circuit configuration of the power distribution system by switching. The generating line 5 is isolated on the side of the transformer 14 and the side of the transformer 33 by an interconnection switch 20. In a case where either of the transformers has malfunctioned, a backup power supply is provided by setting the interconnection switch 20 to the connected state. An interconnection switch 21 or the like is installed so that a feeder line can be interconnected to an adjacent feeder line. When there is a mishap in a feeder line, the section switches before and behind the point of the mishap transition to the disconnected state, and a backup power supply can be provided to the isolated feeder line from the adjacent feeder line by setting the interconnection switch to the connected state.

A boiler generator 26 and production lines 27, 47 are connected to the feeder lines using a reference voltage of 6.6 kV. This 6.6-kV reference voltage is transformed to a lower voltage (a 400-V reference voltage) by the transformers 25, 40, 41, and a solar cell 28, a special production line 29, and a storage battery 30 are connected to one feeder line, and a micro gas turbine generator 43 and a heat pump-based hot water heater 44, a solar cell 45, and a storage battery 46 are connected to another feeder line. Circuit breakers 12, 13, 15, 16, 23, 24, 32, 34, 35, 36, 42 are installed for preventing short-circuit mishaps. The pieces of power equipment are connected to an information communication network 3, and send information such as an operating state, a switching state, a power generation state, or a power storage state, as well as receive control information. A system control apparatus 4 receives the power equipment information via the information communication network 3, performs computing related to equipment operation, and sends control information.

Power equipment refers to power distribution system equipment, such as a transformer, a switch, a circuit breaker, and a feeder line, as well as power-generating equipment, such as a boiler generator, a micro gas turbine generator, a solar cell, and a storage battery 4, and power-using equipment that consumes power, such as a heat pump-based hot water heater, a production line, and a special production line. Sensors for measuring active power, reactive power, and voltage are mounted to the switch and the transformer, and the sensor-measured values are transferred to the system control apparatus 4 via the information communication network 3. Each piece of power equipment comprises a built-in control apparatus 1100.

Figure 2:
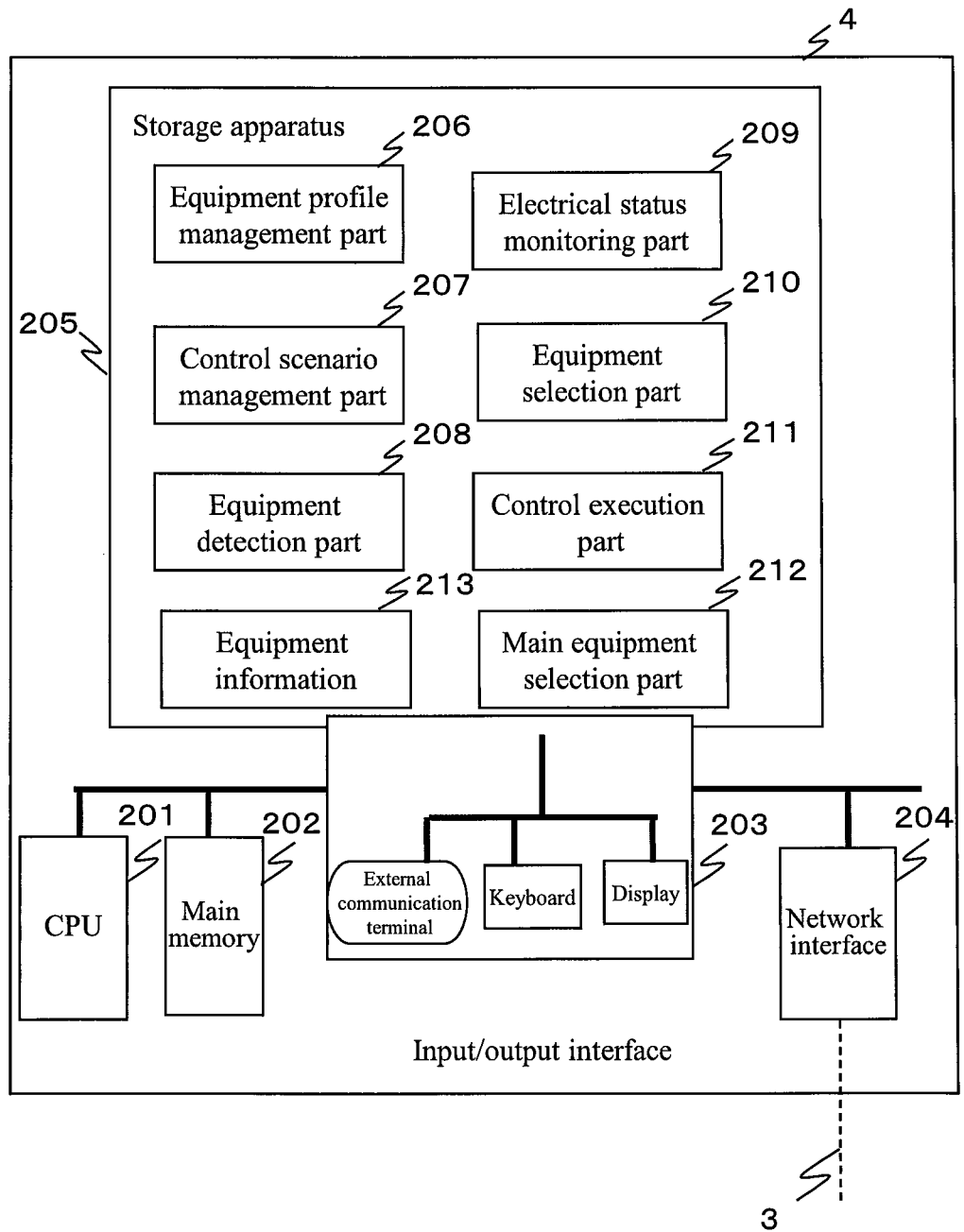
[FIG. 2]

FIG. 2 is a drawing showing the hardware configuration of the system control apparatus 4. The system control apparatus 1 comprises a CPU 201, a main memory 202, an input/output interface 203, a network interface 204, and a storage apparatus 205, and these components are connected by a bus.

The storage apparatus 205 comprises a HDD or the like, and stores a program for realizing the functions of an equipment profile management part 206, a control scenario management part 207, an equipment detection part 208, an electrical status monitoring part 209, an equipment selection part 210, a control execution part 211, and a main equipment selection part 212. The equipment profile management part 206 manages an equipment profile in a case where there is metadata representing the electrical properties of the equipment. As used here, metadata is data that assigns an attribute.

The control scenario management part 207 manages a control scenario in which is described metadata that states an operation to be fulfilled by the equipment (a specific example of a control scenario will be described further below using FIG. 7). The equipment detection part 208 detects equipment targeted for control. The electrical status monitoring part 209 monitors an electrical state, such as the voltage of each part of the feeder line from the sensors in the switches and transformers, and the sensors in the power-generating equipment and the power-using equipment. The equipment selection part 210 selects equipment to be used in accordance with the metadata described in the control scenario and the equipment profile. The control execution part 211 performs control for the selected equipment. The main equipment selection part 212 specifies the power equipment that will be allowed to mainly operate. The equipment information 213 is a database for storing the equipment profile and information related to the main equipment.

The CPU 10 realizes the various functions by performing processing for reading the above-mentioned program from the storage apparatus 205 into the main memory 202 and executing this program. The functions explained hereinabove may be realized using hardware. The program for realizing the above-mentioned functions 5 may be installed from a storage medium such as a CD-ROM, or may be downloaded from another apparatus by way of a network.

Figure 9:
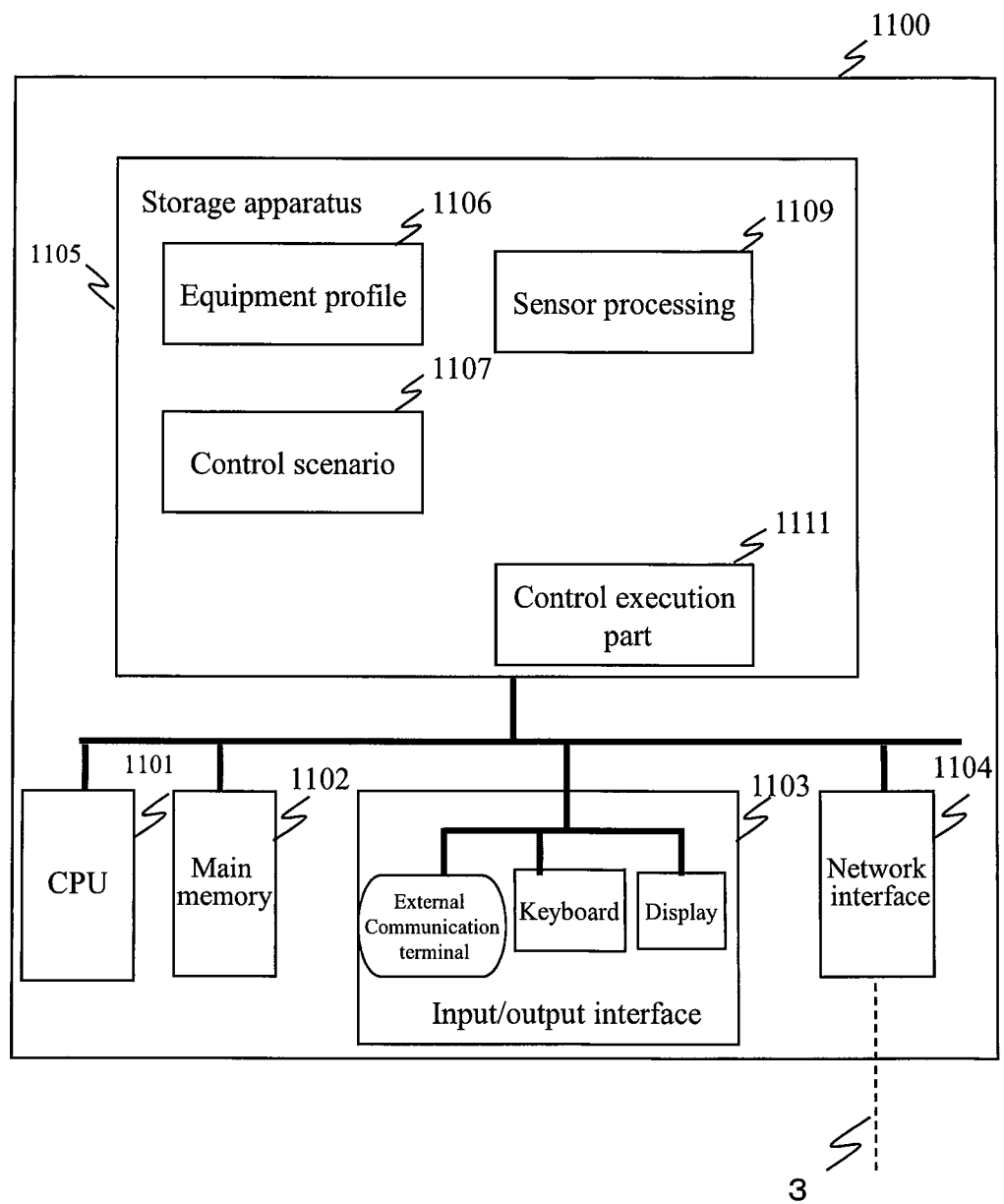
[FIG. 9]

FIG. 9 is a drawing showing the hardware configuration of a power equipment-embedded control apparatus 1100 provided in each piece of power equipment. The power equipment-embedded control apparatus 1100 comprises a CPU 1101, a main memory 1102, an input/output interface 1103, a network interface 1104, and a storage apparatus 1105, and these components are connected via a bus or the like. The storage apparatus 1105 comprises an HDD or the like. The power equipment-embedded control apparatus 1100 comprises functions for starting and stopping such functions as the generation of power, the operation, the charging/discharging, and the supplying of hot water of the power equipment, and functions for the execution of operational control, the processing of sensor data, and communications with the system control apparatus 4. These functions are realized by reading the program in the storage apparatus 1105 to the main memory 1102 and executing this program.

The functions explained hereinabove may be realized using hardware. The program for realizing the above-mentioned functions may be installed from a storage medium such as a CD-ROM, or may be downloaded from another apparatus via a network.

Figure 3:
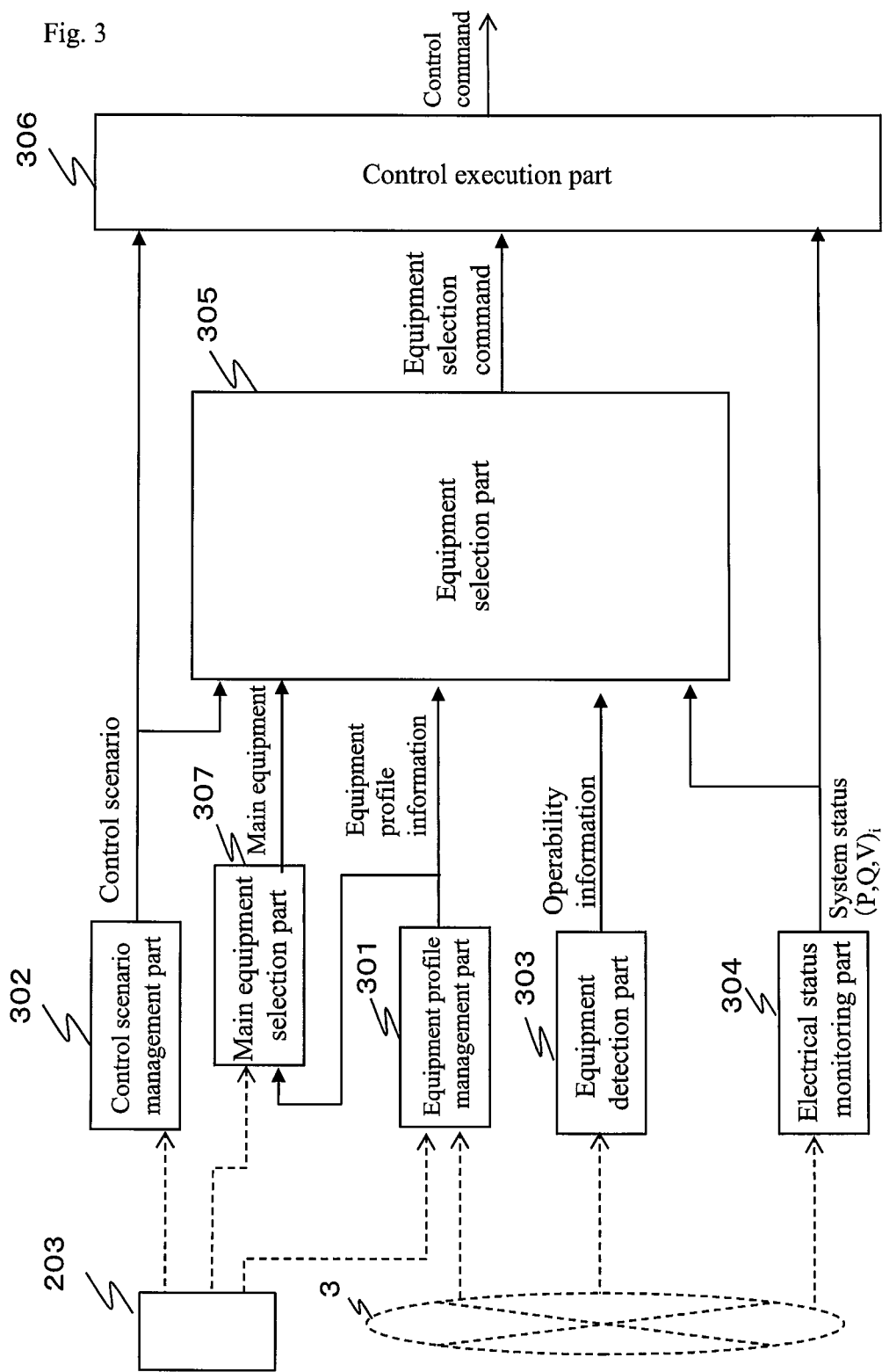
[FIG. 3]

FIG. 3 is a block diagram of the processing of the system control apparatus.

A main equipment selection part 307 selects, in accordance with input from the input/output interface 203, the power equipment that is to be mainly operated. For example, the solar cell 28 is selected.

In order for the main equipment selection part 307 to obtain main equipment input, main equipment candidates may be displayed with respect to the input/output interface 203. The main equipment candidates are displayed in order from the piece of equipment having the lowest carbon dioxide emissions per amount of electrical power generated. Or, the candidates are displayed in order from the piece of equipment having the lowest fuel use per amount of power generated. Or, the candidates are displayed in order from the piece of equipment having the greatest impact on the voltage and/or frequency of the power distribution system. At this time, in order to select a main equipment candidate, the main equipment selection part 307 acquires information related to the carbon dioxide emissions, fuel use, power generation, and uncontrollable power generation fluctuations (amount of power generated using natural energy resources that cannot be controlled) of the equipment from the equipment profile management part 301. This information is stored in the equipment information 213.

For automation purposes, the main equipment selection part 307 may be configured such that a selection is made automatically from among the main equipment candidates without exchanges with the input/output interface. For example, selections are made in order from the main equipment candidate having the lowest carbon dioxide emissions, fuel use, power generation, and uncontrollable power generation fluctuations (amount of power generated using natural energy resource that cannot be controlled).

The equipment profile management part 301, after receiving from the input/output interface 203 an equipment profile describing the properties of the main equipment selected by the main equipment selection part 307, records and stores this equipment profile, and outputs the data of the equipment profile in accordance with an invocation from the equipment selection part 305 or the like.

The equipment profile input may be transferred from the controller embedded in the power equipment via the information communication network 3 (the content of the equipment profile will be explained further below using FIG. 6).

The control scenario management part 302 receives, records and stores an input of a control scenario described in the metadata, such as the electrical operating condition to be fulfilled by the equipment, from the input/output interface 203, and outputs the control scenario data in accordance with an invocation from the equipment selection part 305, the control execution part 306 or the like.

The equipment detection part 303 monitors the power equipment by way of the information communication network 3, detects whether it is possible for the power equipment to have an electrical connection path to a feeder line or the like as a result of equipment installation work and to operate by receiving a control command from the system control apparatus 4, and outputs the detection results as operability information.

The electrical status monitoring part 304 collects via the information communication network 3 sensor measurement values for the active power, reactive power, and voltage of power distribution system equipment, power-generating equipment, and power-using equipment, either monitors or estimates the electrical status (power distribution system status) occurring in accordance with the transfer of power in the respective sections and components of the feeder lines and other power lines interconnecting the power equipment, and outputs this electrical status to the control execution part, the equipment selection part and the like.

A steady voltage drop e (relative to the neutral point voltage) in a section of a power line can be expressed using the following formula, where I is the line current, R is the circuit resistance, X is the circuit reactance, and cos θ is the load power factor, and the voltage can also be estimated for a portion of a power line for which the direct voltage is not measured.

$$e = I(R \cos\theta + X \sin\theta)$$

The equipment selection part 305, based on data from the equipment profile management part 301, the control scenario management part 302, the equipment detection part 303, and the electrical status monitoring part 304, outputs to the control execution part 306 as an equipment selection command "Select a number of pieces of power equipment (secondary equipment)" for realizing collaborative operational control for allowing the control execution part 306 to carry out, in line with the control scenario, the control necessary for the power generation and operation of the equipment (for example, the solar cell 45 and the special production line 29) specified by the input/output interface 203. The secondary equipment will be explained further below in Steps 503 through 506 of FIG. 5.

The control necessary for performing the power generation and operation of the specified equipment includes control aimed at system stabilization for maintaining within a fixed range the voltage, which becomes unstable as a result of the power generation and operation of the power equipment, and control aimed at operations that heighten the economical efficiency of power generation.

The control execution part 306 executes equipment control having a control scenario, an equipment selection command corresponding to the control scenario, and information on the power distribution system status, which is the output of the electrical status monitoring part, as input.

In this embodiment, either blocks 301 through 306 are realized as the functions of the system control apparatus, or blocks 301 through 305 are regarded as the functions of the system control apparatus, and the function of block 306 is realized as the power equipment-embedded controller 1100 function. The realization of the functions using the latter arrangement makes it possible to shorten the time required for communication processing from the monitoring of the electrical status up to the performance of equipment control in the processing of control execution, and reduces the likelihood of system processing becoming destabilized due to communication delays.

Figure 4:
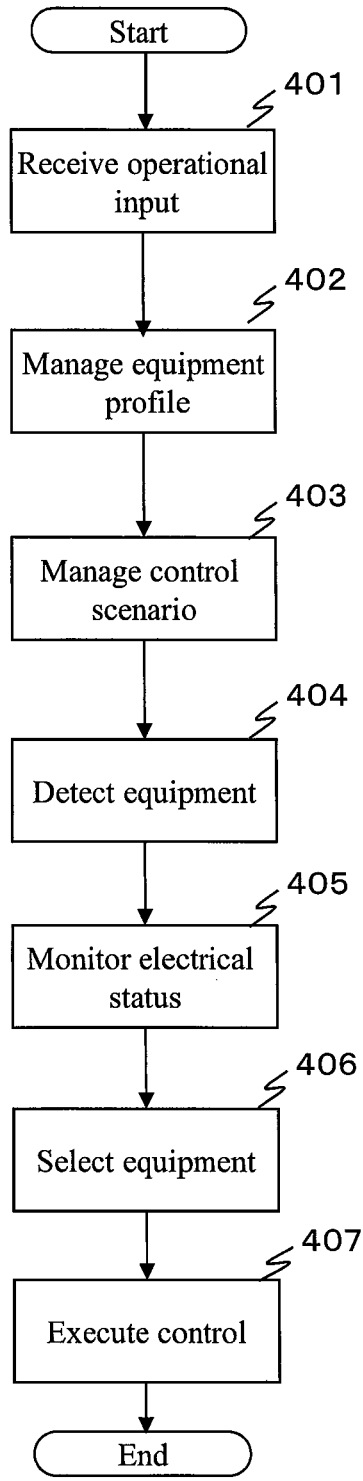
[FIG. 4]

FIG. 4 is a drawing showing a flowchart of the processing of the system control apparatus described hereinabove.

Step 401 is the processing of the main equipment selection part 307 described hereinabove.

Step 402 is the processing of the equipment profile management part 301 described hereinabove.

In Step 402, the input of the power equipment profile having an electrical connection relationship with Step 401 is received and stored.

Step 403 is the processing of the control scenario management part 302 described hereinabove.

Step 404 is the processing of the equipment detection part 303 described hereinabove.

Step 405 is the processing of the electrical status monitoring part 304 described hereinabove. This processing will be explained in detail further below using FIG. 6.

Step 406 is the processing of the equipment selection part 305 described hereinabove.

Step 407 is the processing of the control execution part 306 described hereinabove.

FIG. 5 is a detailed flowchart of the equipment selection processing of Step 406 described hereinabove.

In Step 501, a main equipment specification is received when power equipment, which was specified in Step 401 described hereinabove, is mainly operated.

In Step 502, a list of operable equipment is prepared on the basis of the output of the equipment detection part 303 described hereinabove for other power equipment with which the main operational equipment has an electrical connection relationship by way of a power distribution line or the like. The electrical connection relationship is recorded and stored in the system control apparatus in accordance with the equipment profile, which will be described further below using FIG. 6, and input from the input/output interface 203.

In Step 503, information on the electrical properties of the operable equipment listed in the above-mentioned Step 502 and the main equipment is collected from the equipment profile on the basis of the output of the equipment profile management part 301, and a list is prepared. At this point, for example, information related to the operation of the equipment is summarized in the equipment profile, and this information includes the amount of power either consumed or stored as the equipment operates and a limit on the amount of energy stored.

In Step 504, first of all, a control scenario for the main equipment is acquired from the control scenario management part 302 (the control scenario may be control for stabilizing solar power generation output). Next, a change in the voltage status between pieces of power equipment occurring as the main equipment operates is calculated from information on the electrical connection circuits of the power equipment and information on the output and/or power consumption (charging energy) of the main equipment, and the stability of the power distribution system is computed and assessed (the extent, in terms of either a percentage or an amount, to which the change in the voltage status deviates from the normal voltage level is computed and assessed).

In Step 505, the stability of the power distribution system is determined using the stability computation and assessment described hereinabove (for example, a determination is made as to whether the deviation exceeds 10% of the normal voltage level), and in a case where the system is unstable, the processing advances to Step 506. In a case where the system is stable, the processing advances to Step 507.

In Step 506, first of all, candidate equipment (collaboratively operated secondary equipment) that will influence power distribution system stability in accordance with operating in collaboration with the main equipment are selected from the list of operable equipment described hereinabove on the basis of the information in the list of electrical properties described hereinabove. In the selection, equipment for which the information "Main power equipment to be connected (Equipment.MemberOf_EquipmentContainer rdf:resource)" described in the equipment profile (for example, "secondary side transformer 41") is the same are selected first. In a case where this information is the same, when the main equipment is power generation equipment, selections are made in power storage-related equipment order, such as a storage battery, equipment related to the storage of energy, such as a heat pump-based hot water heater, and energy-consuming equipment. After being invoked one time in this Step, equipment to be collaboratively operated is added each time a determination of unstable is made and an invocation is performed once again in Step 505. Subsequent to equipment for which the "Main power equipment to be connected" is the same, power equipment, for which the main power equipment to which main power equipment to be connected is also connected (for example "feeder line 53") is the same, is selected as a candidate.

In Step 507, an equipment selection command is outputted having the main equipment and the list of candidates of collaboratively operated secondary equipment prepared in Step 506 as equipment identification information.

FIG. 6 shows an equipment profile having a storage battery 46 as an example. Basic information such as type of equipment (deviceType="storage battery"), manufacturer (manufacturerType="name of manufacturing firm"), model name (model="ES400V200M"), and version (version="1.0"), as well as information (properties) related to the list of electrical properties, such as properties for connecting to the power distribution system and forming an electrical circuit, and individual electrical properties are described in the equipment profile. In order to show the circuit configuration, there is described under electrical properties, such as a name space (<Naming.name>name dictionary of the first embodiment), which shows the name in the hardware configuration of FIG. 1 (StorageBattery rdf:ID="storage battery 45") and in which the naming of the configuration components related to the hardware is available, the main power equipment for connection (Equipment.MemberOf_EquipmentContainer rdf: resource="secondary-side transformer 41), and the reference voltage (VoltageLevel.BaseVoltage>400), information on the location where the equipment is arranged electrically (cim:Location rdf:ID=Location. PowerSystemResource rdf:resource=" secondary-side power line transformer 41" of "configuration FIG. 1"), information related to location, such as information (GmlPosition rdf: ID="CP1005">) related to the way of representing the axes of the geographical coordinates (for example, the X, Y coordinates of latitude and longitude), and coordinate positions (GMlPosition.Xcoordinate>187635, GMlPosition.Ycoordinate772863), and under individual electrical properties, there is described a discharge power (PowerLevel.output 200 kW), a charge input (cim:PowerLevel.charge input 200 kW), and a charging capacity (PowerLevel.charging capacity 1000 kWh) in the case of static electrical properties, and, in addition, information related to responsiveness as a dynamic electrical property, to include information related to equipment capabilities such as the order of a transfer function showing the responsiveness property (response transfer function order 1), a time constant (response time constant 0.5), and a dead time (response dead time constant 0).

The above dynamic electrical properties, in addition to being expressed using a transfer function, may also be described using ARMA or another polynomial model, and data for plotting response properties.

FIG. 7 illustrates an example of a control scenario. The control scenario compares the reference voltage to the voltage, and controls output of the main equipment A for charging and consuming in accordance with the power equipment described in the secondary equipment list B. For example, a plurality of main equipment may exist here. In accordance with this, a piece of secondary equipment is selected based on the difference between the totaled output of the plurality of main equipment and the reference voltage.

The control execution part 306 described hereinabove combines the identification information of the main equipment and the secondary equipment outputted from the equipment selection part 305 with respect to A and B, which have been abstracted and specified in the control scenario, and executes control for individual pieces of equipment.

Figure 8:
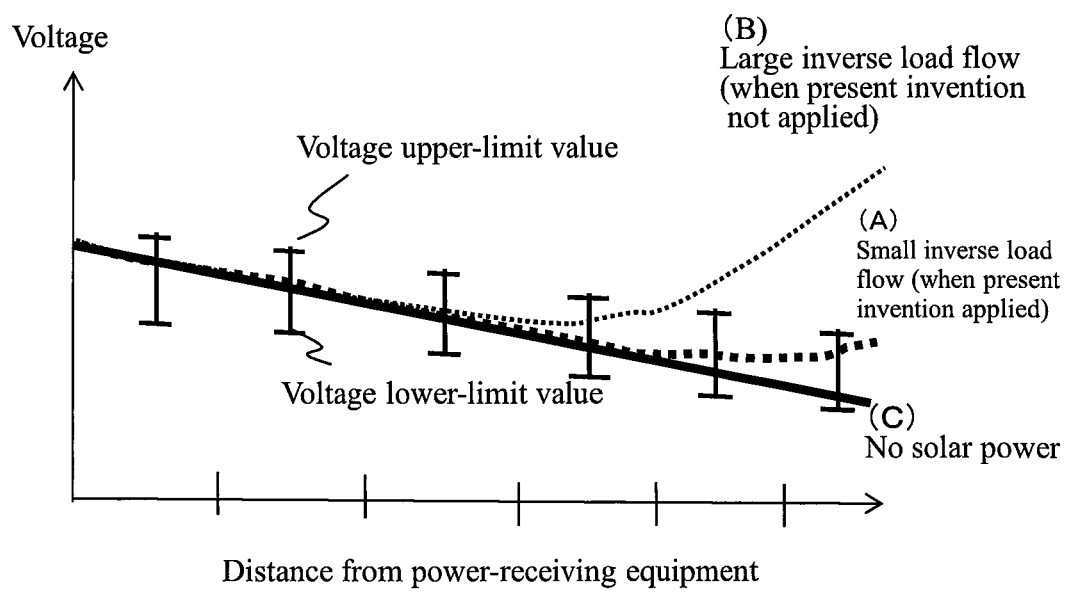
[FIG. 8]

FIG. 8 shows the voltage distribution of the feeder 53 in a case where the system control of this embodiment has been performed. As shown in (A), the voltage has ceased to deviate significantly from the reference voltage.

According to this example, it is possible to reduce the number of man hours required to build and maintain a system for carrying out control aimed at stabilizing a power distribution system that maintains system voltage within a fixed range by the electrical collaboration of various pieces of power equipment, and achieving economical operation for power generation equipment. In particular, the present invention is a system for controlling diverse pieces of power equipment, wherein a power distribution system can be built and maintained without preparing individual application programs beforehand for equipment having different characteristics. The present invention also makes it possible to realize the coordinated operation of a large number of control apparatuses for executing control over a large number of pieces of equipment using respective control execution apparatuses, and to eliminate the sudden loss of functions in the system as a whole due to a failure in a specific apparatus.

The invention claimed is:

1. A system control apparatus for equipment for controlling operation of a plurality of pieces of equipment, comprising:
    a database configured to store an equipment profile related to electrical properties of the equipment, information related to main equipment, which is equipment that needs to be operated among the plurality of pieces of equipment, and a control scenario in which a power target value of the plurality of pieces of equipment and information related to control of the plurality of pieces of equipment are put together;
    an equipment selection part configured to select secondary equipment to be operated on the basis of the equipment profile, the main equipment, and the control scenario; and
    a control execution part configured to give an operation indication to the main equipment and the secondary equipment selected.

2. The system control apparatus for equipment according to claim 1, wherein the equipment selection part calculates a difference between the power target value and a value related to a current power, and selects the secondary equipment on the basis of the difference therebetween and the equipment profiles of a plurality of pieces of secondary equipment.

3. The system control apparatus for equipment according to claim 1, wherein the equipment profile includes an amount of power to be either consumed or stored as the equipment operates, and the power target value is a voltage value.

4. The system control apparatus for equipment according to claim 1, wherein the equipment profile of a storage battery among the equipment includes an amount of stored energy to be stored as the storage battery operates, and a limit on a storage capacity, and
    the equipment selection part uses the amount of stored energy and the limit to select equipment to be operated.

5. The system control apparatus for equipment according to claim 1, wherein the database includes carbon dioxide emissions of the equipment, and
    the equipment selection part selects the equipment in order from the equipment of which the carbon dioxide emissions are lowest.

6. A system control method for equipment in a system control apparatus for equipment for controlling operation of a plurality of pieces of equipment, the system control apparatus for equipment comprising:
    a database configured to store an equipment profile related to electrical properties of the equipment, information related to main equipment, which is equipment that needs to be operated among the plurality of pieces of equipment, and a control scenario in which a power target value of the plurality of pieces of equipment and information related to control of the plurality of pieces of equipment are put together,
    wherein the system control method for equipment comprises the steps of:
    selecting secondary equipment to be operated on the basis of the equipment profile, the main equipment, and the control scenario; and
    giving an operation indication to the main equipment and the secondary equipment selected.

7. The system control method for equipment according to claim 6, wherein in the step of selecting the equipment, a difference between the power target value and a value related to a current power is calculated, and
    the secondary equipment is selected on the basis of the difference therebetween and the equipment profiles of a plurality of pieces of secondary equipment.

8. The system control method for equipment according to claim 6, wherein the equipment profile includes an amount of power to be either consumed or stored as the equipment operates, and
    the power target value is a voltage value.

9. The system control method for equipment according to claim 6, wherein the equipment profile of a storage battery among the equipment includes an amount of stored energy to be stored as the storage battery operates, and a limit on a storage capacity, and
    in the step of selecting the equipment, the amount of stored energy and the limit are used to select equipment to be operated.

10. The system control method for equipment according to claim 6, wherein the database includes carbon dioxide emissions of the equipment, and
    in the step of selecting the equipment, the equipment is selected in order from the equipment of which the carbon dioxide emissions are lowest.

* * * * *